United States Patent
Miyauchi et al.

(10) Patent No.: US 8,365,231 B2
(45) Date of Patent: Jan. 29, 2013

(54) VIDEO SERVER BASED PROGRAM DELIVERY SYSTEM AND METHOD

(75) Inventors: Hiroyuki Miyauchi, Yokohama (JP); Akio Tsuruoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 90 days.

(21) Appl. No.: 11/599,372

(22) Filed: Nov. 15, 2006

(65) Prior Publication Data

US 2007/0124754 A1 May 31, 2007

(30) Foreign Application Priority Data

Nov. 15, 2005 (JP) ................................ 2005-330527

(51) Int. Cl.
- *G06F 3/00* (2006.01)
- *G06F 13/00* (2006.01)
- *H04N 5/445* (2011.01)
- *H04N 7/173* (2011.01)
- *H04N 5/222* (2006.01)

(52) U.S. Cl. .............. 725/59; 725/86; 725/93; 725/115; 725/116; 348/722; 715/716; 715/717

(58) Field of Classification Search .................. 725/115, 725/116, 86, 93; 348/722; 715/716–717
See application file for complete search history.

(56) References Cited

U.S. PATENT DOCUMENTS

| | | | |
|---|---|---|---|
| 5,756,280 A * | 5/1998 | Soora et al. | 725/116 |
| 6,002,995 A * | 12/1999 | Suzuki et al. | 348/143 |
| 7,024,677 B1 * | 4/2006 | Snyder et al. | 725/93 |
| 7,079,176 B1 * | 7/2006 | Freeman et al. | 348/207.1 |
| 7,526,568 B1 * | 4/2009 | Swanton et al. | 348/211.4 |
| 7,859,571 B1 * | 12/2010 | Brown et al. | 348/211.3 |
| 2002/0188943 A1 * | 12/2002 | Freeman et al. | 725/38 |
| 2003/0122924 A1 * | 7/2003 | Meyers | 348/14.11 |

(Continued)

FOREIGN PATENT DOCUMENTS

| | | |
|---|---|---|
| CN | 100471234 C | 3/2009 |
| JP | 09-305356 | 11/1997 |

(Continued)

OTHER PUBLICATIONS

Communication from Japanese Patent Office, Notice of Reasons for Rejections, mailed May 26, 2009 in co-pending Japanese Application No. 2005-330527, including English language translation document (5 pages total).

(Continued)

*Primary Examiner* — Pankaj Kumar
*Assistant Examiner* — Randy Flynn
(74) *Attorney, Agent, or Firm* — Finnegan, Henderson, Farabow, Garrett & Dunner, L.L.P.

(57) ABSTRACT

A program delivery system includes a video server that records a plurality of server contents and outputs the server contents, a video switcher which selectively switches between server contents and live contents, and delivers the switched contents as an on-air video image, a content selection module which presents live content buttons and server content buttons, and accepts an operation of selecting any one of the buttons, a live content module which, switches the video switcher, and delivers the live contents, at the time that the live content button has been selected, and a server content module which, outputs the server contents that correspond to the button, and at the same time, switches the video switcher and delivers the server contents, at the time that the server content button has been selected.

7 Claims, 3 Drawing Sheets

U.S. PATENT DOCUMENTS

| | | | |
|---|---|---|---|
| 2003/0142955 A1* | 7/2003 | Hashizume et al. | 386/113 |
| 2004/0179816 A1* | 9/2004 | Takehana | 386/52 |
| 2005/0010955 A1* | 1/2005 | Elia et al. | 725/38 |
| 2005/0055154 A1* | 3/2005 | Tanaka et al. | 701/200 |
| 2005/0076310 A1* | 4/2005 | Tada | 715/838 |
| 2005/0283804 A1* | 12/2005 | Sakata et al. | 725/38 |
| 2006/0107289 A1* | 5/2006 | DeYonker et al. | 725/37 |

FOREIGN PATENT DOCUMENTS

| | | |
|---|---|---|
| JP | 2000-163867 | 6/2000 |
| JP | 2001-005838 | 1/2001 |
| JP | 2001-77776 | 3/2001 |
| JP | 2001-144705 | 5/2001 |
| JP | 2002-185851 | 6/2002 |
| JP | 2002-290928 | 10/2002 |
| WO | WO 02078348 A2 * | 10/2002 |

OTHER PUBLICATIONS

Office Action issued on Sep. 28, 2009 by the Mexican Patent Office in Corresponding Mexican Patent Application No. PA/A/2006/013150 filed Nov. 13, 2006 (Folio No. 79549) with translation of Office Action (7 pages total).

Office Action issued on Mar. 25, 2011 by the Canadian Intellectual Property Office in Corresponding Canadian Patent Application No. 2,567,957 in English (3 pages total).

* cited by examiner

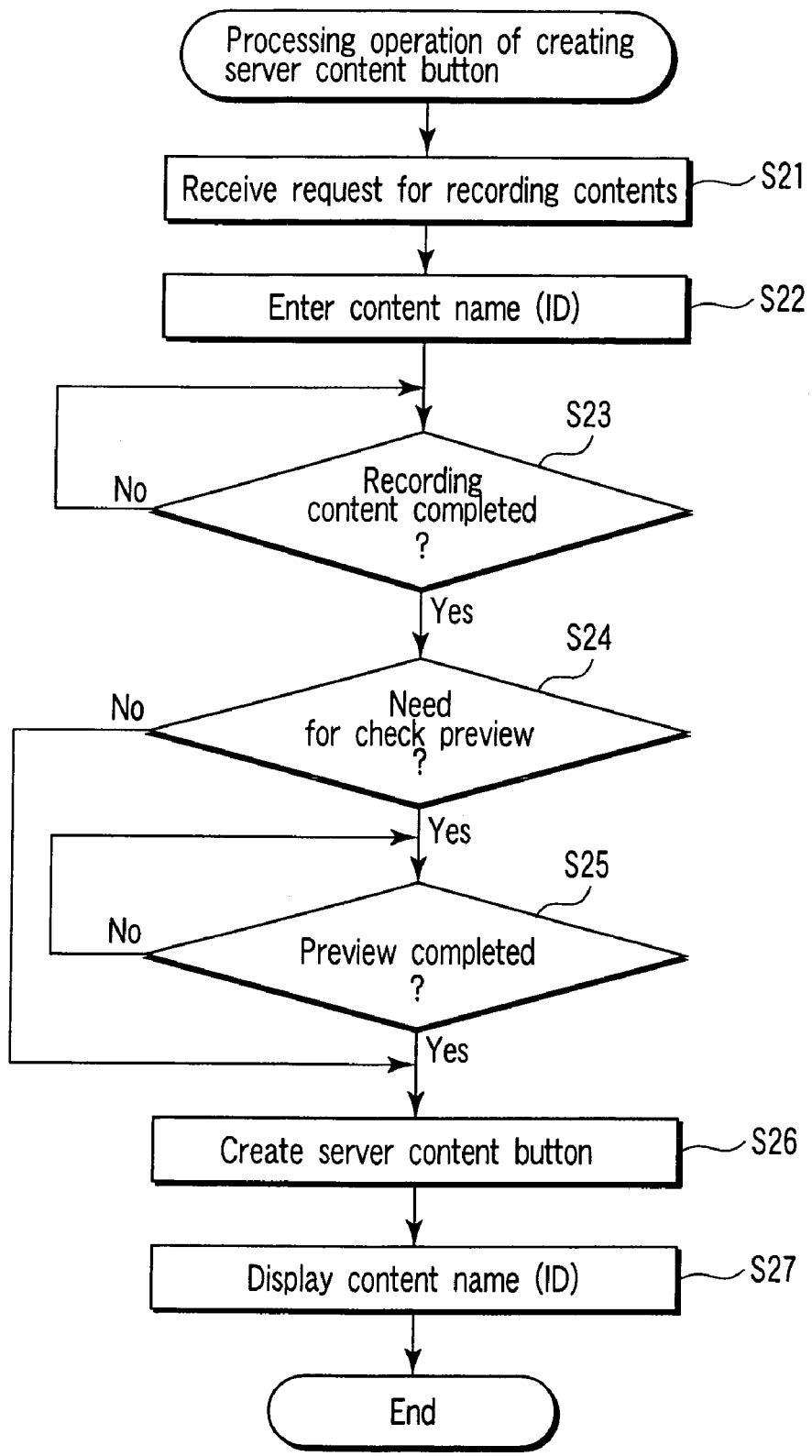
F I G. 2

VIDEO SERVER BASED PROGRAM DELIVERY SYSTEM AND METHOD

CROSS-REFERENCE TO RELATED APPLICATIONS

This application is based upon and claims the benefit of priority from prior Japanese Patent Application No. 2005-330527, filed Nov. 15, 2005, the entire contents of which are incorporated herein by reference.

BACKGROUND OF THE INVENTION

1. Field of the Invention

The present invention relates to a program delivery system and a method for use in the video server based program delivery system. In particular, the present invention relates to a program delivery system for switching and delivering a plurality of contents as on-air broadcasts.

2. Description of the Related Art

Contents of live programs such as news or variety shows are roughly classified into live contents (such as studio internal cameras or relay lines from other broadcast stations) and server contents outputted from a video server. These contents are inputted to a video switcher, and the contents selected in the video switcher are delivered as on-air broadcasts. When these contents are manually delivered, an operator merely makes an operation of selecting an input line by means of the video switcher in the case of live contents. However, in the case of server contents, the operator need to execute complicated operating steps of video server port allocation, standby (pause), play start control and the like prior to the above input line selection. Thus, there are some cases that the delivery of the server contents has not been successfully carried out by simple operation in the same manner as that of the live contents.

The associated technique is disclosed in Jpn. Pat. Appln. KOKAI Publication Nos. 2001-77776 (reference 1) and 2002-290928 (reference 2). In reference 1, there is disclosed a technique of reducing a time from recording to start of delivery by automating a work of setting a content length or the like at the time of recording. In reference 2, there is disclosed a technique of easily finding a broadcast trouble by presenting content information prior to delivery of contents.

As described above, while live contents can be easily delivered by only an operation of selecting an input line, the delivery of server contents requires complicated operating steps of video server port allocation, standby (pause), play start control and the like in advance. Thus, there has been a problem that the delivery of the server contents is complicated in operation, a large amount of time is required for delivery of contents, or an incorrect operation is likely to occur.

BRIEF SUMMARY OF THE INVENTION

It is an object of the present invention to provide a program delivery system and a method capable of easily delivering live contents and server contents in accordance with identical procedures.

According to one aspect of the present invention, there is provided a program delivery system comprising: a video server, which records a plurality of server contents and outputs the server contents; a video switcher which selectively switches between server contents inputted from the video server and live contents to be externally inputted, and delivers the switched contents as an on-air video image; a content selection module which presents a live content button that corresponds to the live contents and a plurality of server content buttons that correspond to said plurality of server contents, respectively, and accepts an operation of selecting any one of the buttons; a live content module which, switches the video switcher, and delivers the live contents as an on-air video image, at the time that the content selection module accepts the live content button has been selected; and a server content module which, outputs the server contents that correspond to the button, and at the same time, switches the video switcher and delivers the server contents as an on-air video image at the time that the content selection module accepts the server content button has been selected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flow chart showing procedures for, and contents of, a processing operation of creating a server content button displayed on a touch panel device of a video controller shown in FIG. 1;

DETAILED DESCRIPTION OF THE INVENTION

Now, an embodiment of the present invention will be described in detail with reference to the accompanying drawings.

Figure 1:
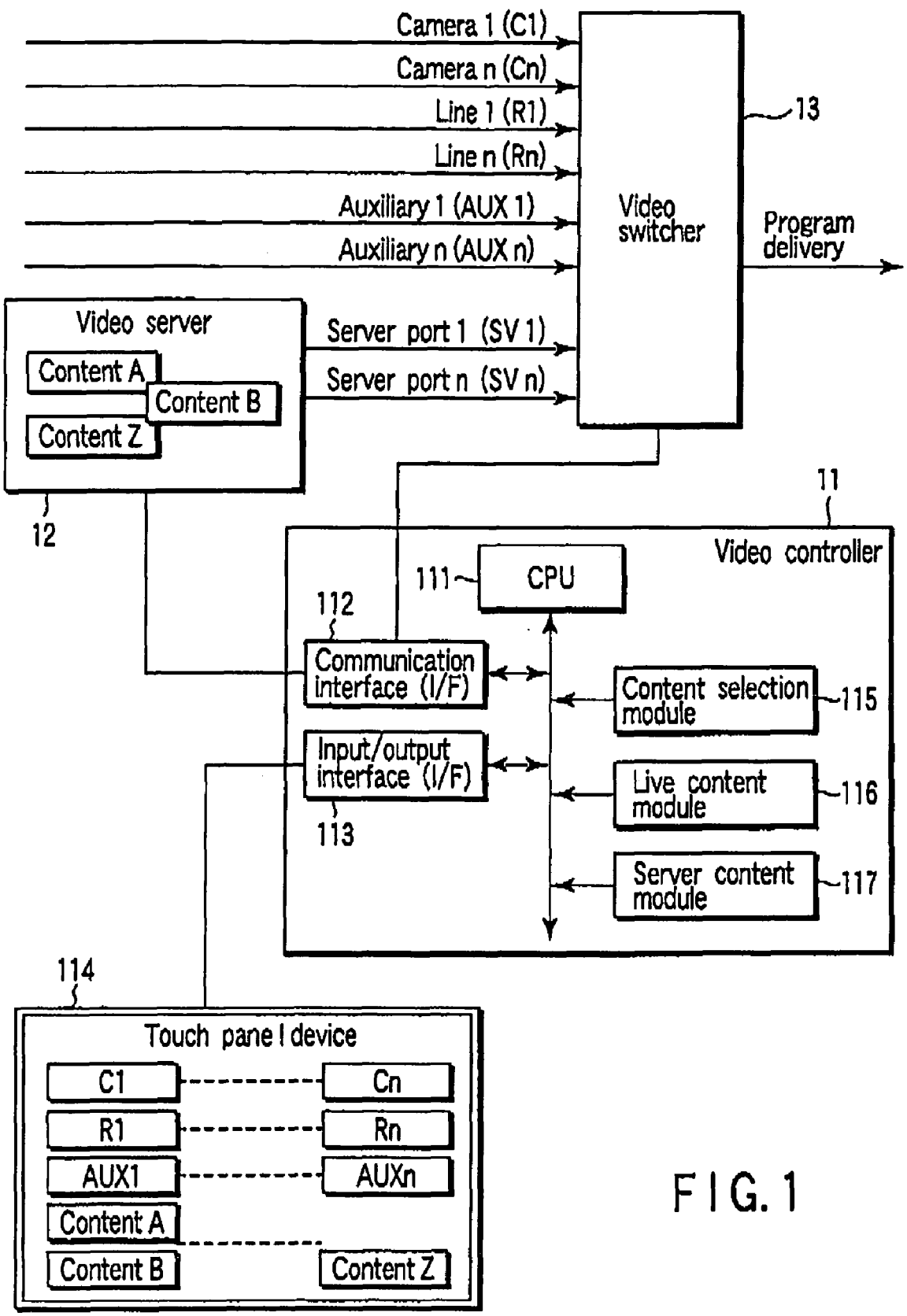
FIG. 1 is a functional block diagram depicting an embodiment of a program delivery system according to the present invention.

FIG. 1 is a functional block diagram depicting an embodiment of a program delivery system according to the present invention. This program delivery system is equipped with a video controller 11; a video server 12; and a video switcher 13. As video image contents of a live program, live contents (such as announcer and local relay) are inputted in real time from cameras C1 to Cn, lines R1 to Rn, and other real time video images AUX1 to AUXn. Server contents are stored in advance as contents A to Z in the video server 12, respectively.

The video server 12 outputs at baseband the server contents selected by the video controller 11 from specified server ports SV1 to SVn. Contents are inputted to the video switcher 13 from the cameras C1 to Cn, the lines R1 to Rn, the other real time video images AUX1 to AUXn, and the server ports SV1 to SVn. The video switcher 13 selects an input line of any one of the above elements and delivers the selected input line as an on-air video image, based on a control signal supplied from the video controller 11.

In addition, as shown in FIG. 1, the video controller 11 is equipped with a CPU 111, a communication interface (I/F) 112, an input/output interface (I/F) 113, a touch panel device 114, a content selection module 115, a live content module 116, and a server content module 117. The communication interface (I/F) 112 is composed of network devices. The CPU 111 carries out communication between the video server 12 and the video switcher 13 by means of this communication interface (I/F) 112. An operation input device such as the touch panel device 114 is connected to the input/output interface (I/F) 113. Instead of this touch panel device 114, input devices such as mouse and keyboard and a display device provided to a general personal computer can also be configured in combination.

The content selection module 115 displays live content buttons and server content buttons on the above touch panel device 114 under the control of the CPU 111, and then, accepts an operation of selecting either of these buttons. The live content button is displayed for each input line (cameras C1 to Cn, lines R1 to Rn, and other real time video images AUX1 to AUXn) in order to accept a selection of live contents targeted for delivery. The server content button is created in association with contents (contents A to Z) recorded in the video server 12 in order to accept a selection of the server contents targeted for delivery. The server content button is updated in display according to a recording condition of the contents in the video server 12.

The live content module 116 delivers the live contents selected by switching the video switcher 13 as an on-air video image at the time that the live content button has been selected by means of the content selection module 115. At the time that the server content button has been selected by means of the content selection module 115, the server content module 117 outputs the server contents corresponding to the button from an output port to the video server 12. At the same time, the server content module 117 switches the video switcher 13, and then, delivers the server contents as an on-air video image.

Next, an operation of the thus configured program delivery system will be described.

(Processing Operation of Creating Server Content Button)

FIG. 2 is a flow chart showing procedures for, and contents of, a processing operation of creating a server content button displayed on the touch panel device 114 of the video controller 11. When the video server 12 accepts a request for recording server contents (step S21), the server accepts an input of a content name (ID) (step S22), and carries out recording processing operation until recording of the contents is completed (step S23). Next, the video server 12 accepts a selective input as to whether or not there is a need for carrying out preview for checking recorded contents (step S24). In the case where it has been selected that preview is carried out, the video server 12 reads out and plays the contents recorded above (step S25).

When the recording processing operation is completed, the video server 12 notifies the video controller 11 that contents have been newly recorded together with the content name (ID). The content selection module 115 of the video controller 11 creates a server content button of the recorded contents (step S26), and then, displays the content name (ID) notified to this server content button on a screen of the touch panel device 114 (step S27).

(Processing Operation of Deleting Server Content Button)

Figure 3:
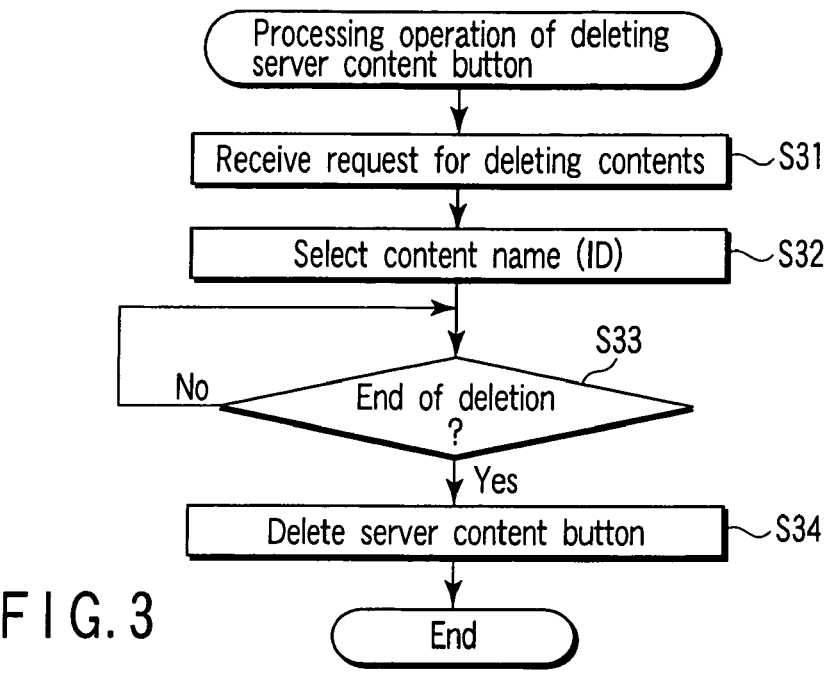
FIG. 3 is a flow chart showing procedures for, and contents of, a processing operation of deleting the server content button displayed on the touch panel device of the video controller shown in FIG. 1.

FIG. 3 is a flow chart showing procedures for, and contents of, a processing operation of deleting the server content button displayed on the touch panel device 114 of the video controller 11. When the video server 12 accepts a request for deleting server contents recorded (step S31), this server accepts a selection of a content name (ID) targeted for deletion (step S32). The video server 12 then deletes the selected server contents (step S33). When the content deleting processing operation is completed, the video server 12 notifies the video controller terminal 11 that the contents have been deleted together with the content name (ID). The content selection module 115 of the video controller 11 deletes the server content button that corresponds to the thus deleted contents from a screen of the touch panel device 114 (step S34).

(Processing Operation of Delivering Contents)

Figure 4:
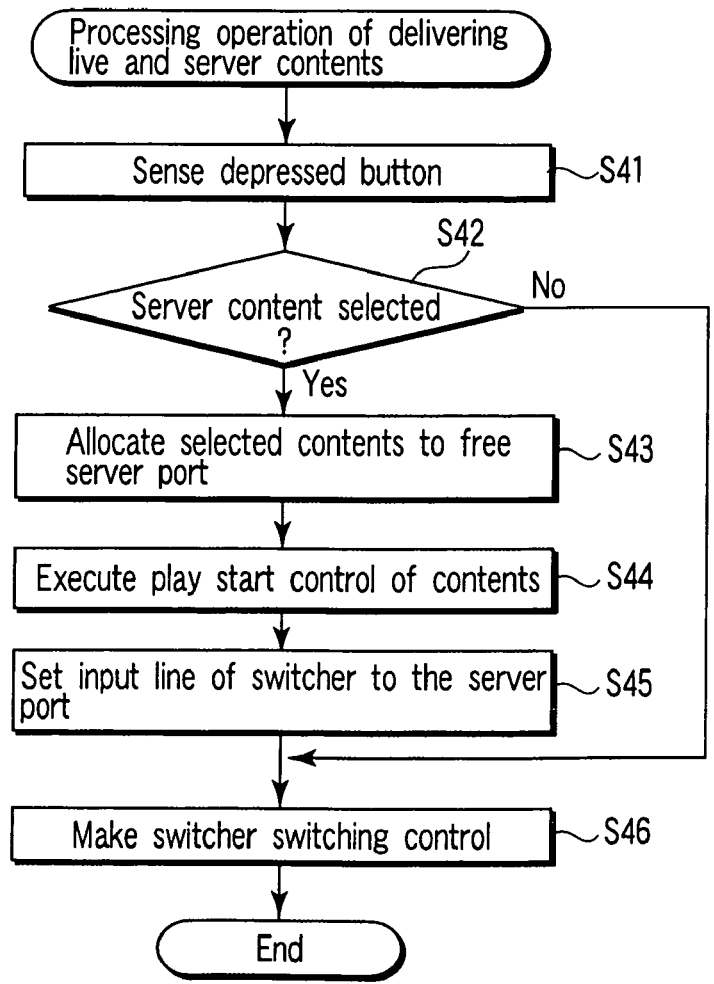
FIG. 4 is a flow chart showing procedures for, and contents of, a processing operation of delivering contents of the program delivery system shown in FIG. 1.

FIG. 4 is a flowchart showing procedures for, and contents of, a processing operation of delivering contents in the above configured program delivery system. When the content selection module 115 of the video controller 11 senses that either one of the live content buttons and the server content buttons on the touch panel device 114 has been depressed (step S41), it is judged whether or not the depressed button is a selection of the server contents (step S42). In the above judgment, in the case where it is judged that the live content button for specifying any of the cameras C1 to Cn, the lines R1 to Rn and the other real time video images AUX1 to AUXn has been selected, the current step moves to step S46 in which the live content module 116 of the video controller 11 switches the video switcher 13 to the selected input line, and then, delivers the live content as an on-air video image.

On the other hand, in the judgment of step S42, in the case where it is judged that the selected contents are server contents for specifying any of the contents A to Z, the server content module 117 of the video controller 11 notifies the selected content name (ID) to the delivery server 12. Then, the delivery server 12 detects a free port among a plurality of output ports, and then, allocates delivery of the notified contents to the detected free port (step S43). Further, the server content module 117 makes play start control of the above contents with respect to the video server 12 (step S44). At the same time, the server content module 117 sets an input line of the video switcher 13 to the server port allocated to the above contents (step S45). The video switcher 13 delivers the selected server contents as an on-air video image by switching to the set port (step S46).

Conventionally, in the video controller 11 for controlling video image switching, selection buttons (cameras C1 to Cn, lines R1 to Rn, other real time video images AUX1 to AUXn, and server ports SV1 to SVn) have been allocated by input line of the video switcher 13. Thus, while live contents can be delivered merely by selecting a selection button, there has been a need for complicated operations including output port allocation and content selection at the video server 12 (standby and play control) and selection of input line (server port SV1 to SVn) at the video controller 11 in the case of the server contents.

In contrast, in the present invention, on the touch panel device 114 of the video controller 11, a live content button for each input line is displayed with respect to live contents, and an server content button for each content recorded in the video server 12 is displayed with respect to server contents. The contents selected by the server content button are notified to the video server 12, and the video server 12 allocates delivery of the contents to a free port, and then, makes play control. Then, the video controller 11 automatically outputs the selected server contents as an on-air video image by switching an input line of the video switcher 13 to the allocated port.

With this configuration, the delivery of the server contents can be carried out by only a content selecting operation, thus making it possible to uniform the procedures for operations of delivering live contents and server contents. In this manner, an operator can make a program delivery operation easily and accurately without a need to worry about types of contents (live contents or server contents).

The present invention is not limited to the embodiment described above. For example, thumbnail images created based on content video images may be displayed on a server content button. By doing this, the operator can make a delivery operation while checking the contents, thus making it possible prevent an incorrect selection of contents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A program delivery system comprising:
    a video server which receives requests to record content, receives content names to identify the content, records a plurality of content, and outputs the recorded content;
    a video switcher which selectively switches between content received from the video server and live input from a camera, and delivers the switched content as an on-air video image;
    a content selection module which:
        (i) presents a live content button, the live content button providing access to the live input content,
        (ii) creates and presents a plurality of server content buttons displaying the received content names, selection of the buttons providing access to the recorded content, the buttons being created after determining completion of recording of the content, and
        (iii) accepts a selection of the live content button or any one of the server content buttons to deliver either the live input or the recorded content as an on-air video image at the time of the selection;
    a live content module which switches the video switcher and delivers the live input content as an on-air video image at the time that the content selection module accepts the selection of the live content button; and
    a server content module which outputs the recorded content corresponding to the selected server content button and, at the same time, switches the video switcher and delivers the recorded content as an on-air video image at the time that the content selection module accepts the selected server content button;
    the video server including a plurality of output ports; and
    the server content module detecting a free port among said output ports, and outputting the selected recorded content by means of the detected free port.

2. The program delivery system according to claim 1, wherein when the recorded content has been deleted from the video server, the content selection module deletes the server content button that corresponds to the deleted server content.

3. The program delivery system according to claim 1, wherein the content selection module further displays thumbnails created based on a video image of the recorded content as the server content buttons.

4. A method for use in a program delivery system which comprises: a video server which receives requests to record content, receives content names to identify the content, records a plurality of content, and outputs the recorded content; and a video switcher which selectively switches between content received from the video server and live input from a camera, and delivers the switched content as an on-air video image, the method comprising:
    presenting a live content button, the live content button providing access to the live input content;
    creating and presenting a plurality of server content buttons displaying the received content names, selection of the buttons providing access to the recorded content, wherein the plurality of server content buttons are created after determining completion of recording of the content;
    accepting a selection of the live content button or any one of the server content buttons to deliver either the live input or recorded content as an on-air video image at the time of the selection;
    switching the video switcher, and delivering the live content as an on-air video image at the time of accepting the selected live content button; and
    outputting the recorded content that corresponds to the selected server content button and, at the same time, switching the video switcher and delivering the recorded content as an on-air video image at the time of accepting the selected server content button;
    wherein when the video server includes a plurality of output ports, the outputting further includes detecting a free port among the plurality of output ports, and outputting the recorded content by means of the detected free port.

5. The method according to claim 4 further comprising when recorded contents have been deleted from the video server, deleting the server content button that corresponds to the deleted contents.

6. The method according to claim 4, wherein the presenting the plurality of server content buttons further includes displaying thumbnails created based on a video image of the recorded content as the server content buttons.

7. A program delivery system comprising:
    a video server which stores a plurality of content, receives content names to identify the content, and outputs the stored content;
    a video switcher which selectively switches between content received from the video server and live input from a camera, the switching occurring during delivery of an on-air video image, and which delivers the switched content as the on-air video image;
    a content selection module which:
        (i) presents a live content button, the live content button providing access to the live input content,
        (ii) creates and presents a plurality of server content buttons displaying the received content names, the buttons providing access to the stored content, and
        (iii) accepts a selection of the live content button or any one of the server content buttons to deliver either the live input or the stored content as an on-air video image at the time of the selection;
    a live content module which switches the video switcher and delivers the live content during delivery of the on-air video image, at the time that the live content button is selected; and
    a server content module which outputs the stored content that corresponds to the server content button and, at the same time, switches the video switcher and delivers the stored content during delivery of the on-air video image at the time that the server content button is selected, wherein the video server includes a plurality of output ports, and the server content module detects a free port among the output ports, and then outputs the selected stored content by means of the detected free port.

* * * * *